United States Patent [19]
Holl et al.

[11] Patent Number: 5,388,669
[45] Date of Patent: Feb. 14, 1995

[54] BRAKE ACTUATOR WITH ELECTROMAGNET, CAM, AND HYDRAULIC PISTON COMPONENTS

[75] Inventors: Eberhard Holl, Schwieberdingen; Frieder Keller, Bretten; Peter Schubert, Stuttgart; Steffen Kaehler, Kornwestheim; Claus Kramer, Besigheim; Hermann Winner, Karlsruhe, all of Germany

[73] Assignee: Robert Bosch GmbH, Stuttgart, Germany

[21] Appl. No.: 28,874

[22] Filed: Mar. 10, 1993

[30] Foreign Application Priority Data

Mar. 11, 1992 [DE] Germany ............... 4207641

[51] Int. Cl.$^6$ .................... B60T 13/74; B60T 1/06
[52] U.S. Cl. .................... 188/71.2; 188/72.6; 188/72.8; 188/106 F; 188/346; 192/35
[58] Field of Search ............ 188/71.2, 72.6–72.8, 188/156, 161, 163, 137, 138, 72.2, 346, 106 F, 106 P; 192/35, 12 R, 40, 85 AA

[56] References Cited
U.S. PATENT DOCUMENTS

| | | | |
|---|---|---|---|
| 3,613,845 | 10/1971 | Hollander | 192/40 X |
| 4,130,188 | 12/1978 | Askew | 188/156 X |
| 4,657,120 | 4/1987 | Farr | 188/71.2 X |
| 4,693,352 | 9/1987 | Lang et al. | 192/85 AA X |
| 5,107,967 | 4/1992 | Fujita et al. | 188/72.1 |

FOREIGN PATENT DOCUMENTS

| | | | |
|---|---|---|---|
| 0177767 | 4/1986 | European Pat. Off. | |
| 4021572 | 1/1991 | Germany | |
| 2197701 | 5/1988 | United Kingdom | 188/71.2 |

*Primary Examiner*—Robert J. Oberleitner
*Assistant Examiner*—Josie A. Ballato
*Attorney, Agent, or Firm*—Edwin E. Greigg; Ronald E. Greigg

[57] ABSTRACT

A disk brake having an electromagnetic friction clutch that can be brought into controllable frictional engagement with a brake disk. The friction clutch can act on a device for generating hydraulic pressure independent of the direction of rotation, and this pressure can act upon a clamping device for operating friction linings. To press the friction linings against the brake disk, energy is taken from the rotating vehicle wheel by means of the friction clutch and metered to the clamping device with pressure fluid as the energy carrier. The friction brake can be used in passenger cars, for example.

5 Claims, 3 Drawing Sheets

BRAKE ACTUATOR WITH ELECTROMAGNET, CAM, AND HYDRAULIC PISTON COMPONENTS

RELATED APPLICATION

This application relates to subject matter generally similar to another application filed simultaneously by the same assignee, the application being identified by German Patent Appl. No. P 42 07 640.4, reference no. R.25088, and further identified by U.S. Pat. No. 5,322,146.

BACKGROUND OF THE INVENTION

The invention is based on a friction brake for braking a vehicle equipped with at least one friction brake as described hereinafter.

Such a friction brake in the form of a disk brake is already known (German DE 40 21 572 A1), in which an electric motor acts as the drive source for the clamping device. Its motor shaft is connected by a non-shiftable coupling to a worm of a worm gear whose worm wheel is seated on a recirculating ball screw that indirectly engages the piston of the clamping device. The clamping power for this friction brake must therefore be provided solely by the electric motor. Because limited space is available for it inside the wheel rim of the vehicle wheel, only a relatively small electric motor can be used. For a motor with limited capacity to generate the necessary clamping power, the worm gear must have a high transmission ratio. As a consequence, the brake reacts relatively sluggishly to braking signals. Although it would be possible to increase the dynamics of the friction brake by putting a higher load on the electric motor, this would result in negative repercussions on the electrical system of the vehicle. Moreover, a considerable disadvantage is the self-locking action of the worm gear, so that an electric motor is also required to release the brake. A non-self-releasing brake, however, represents a potentially serious danger.

It is further known (EP 0 177 767 A1) to provide vehicles with a hydraulic deceleration device triggered by the driver in the form of a service brake. In this case, a positive displacement pump is used that is disposed in a wheel hub, on the delivery side of which a device for generating a counterpressure is positioned, and a cooling device is downstream of the device. The pump can have an adjustable volumetric displacement and be triggered by a servo motor. Such a brake has limited dynamics. Moreover, the hydraulic deceleration device is also subject to losses in the non-braking state. In addition, the cooling device requires a great deal of space.

OBJECT AND SUMMARY OF THE INVENTION

In contrast, the friction brake in accordance with the invention has an advantage that it can be controlled with very low power output, because the energy required to provide the clamping power for the clamping device is drawn from the vehicle wheel to be braked. This drawing of energy already contributes to braking. The clamping power is adjustable with very high dynamics. Only a fraction of one wheel rotation is required for the buildup of the clamping power. A particular advantage, however, is that the friction brake in accordance with the invention can be used for driving in reverse as well. No electrical control energy is required to release the brake. In the non-braking time the friction brake is free of power loss.

The invention is distinguished in that, during braking, an energy source for controlling the friction clutch is only under a light load; during the remaining non-braking time, the vehicle is not subjected to a loss in power caused by the brake.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
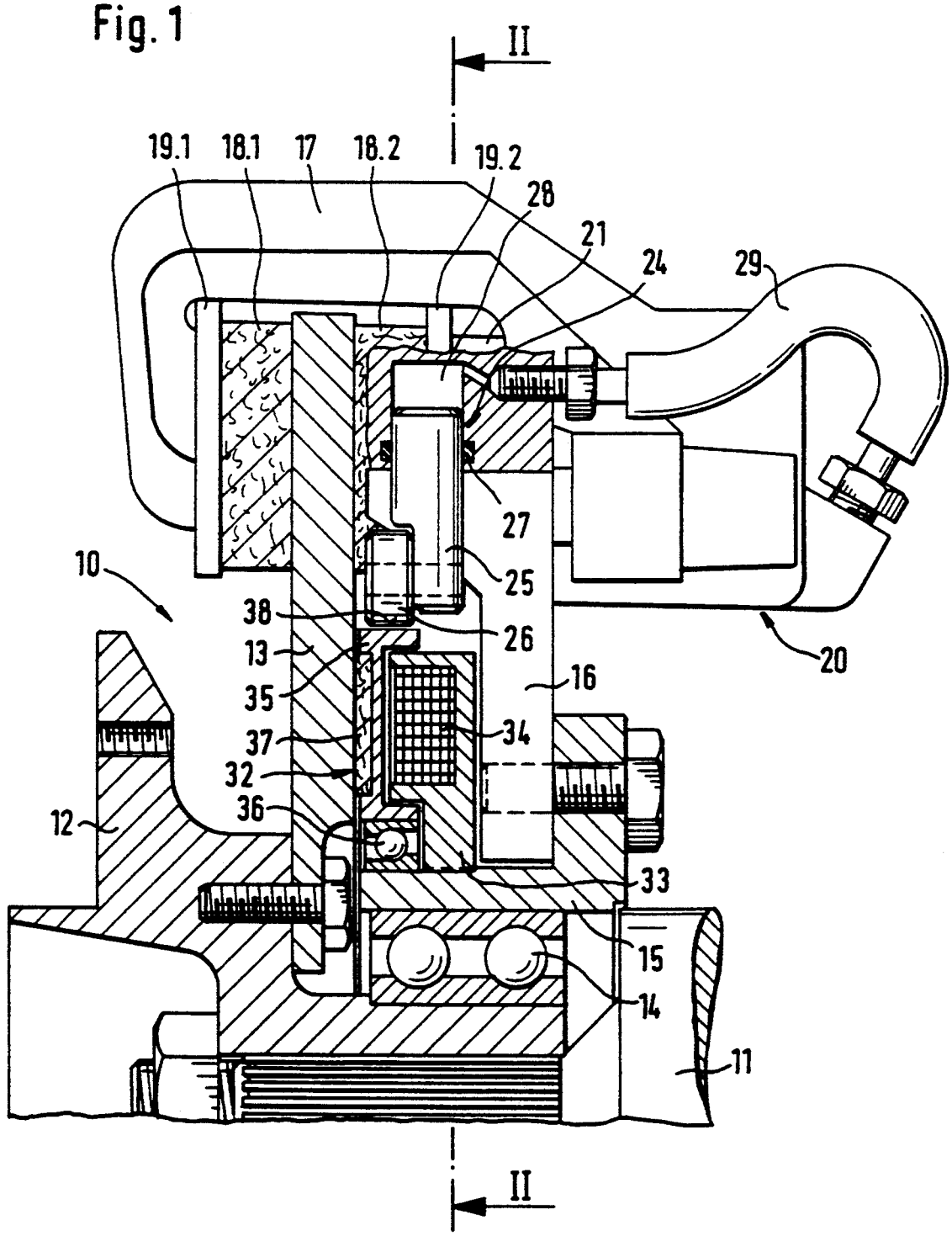
FIG. 1 shows a semi-sectional view of a friction brake with a friction clutch engaging a friction member for hydraulically operating a clamping device.
Figure 2:
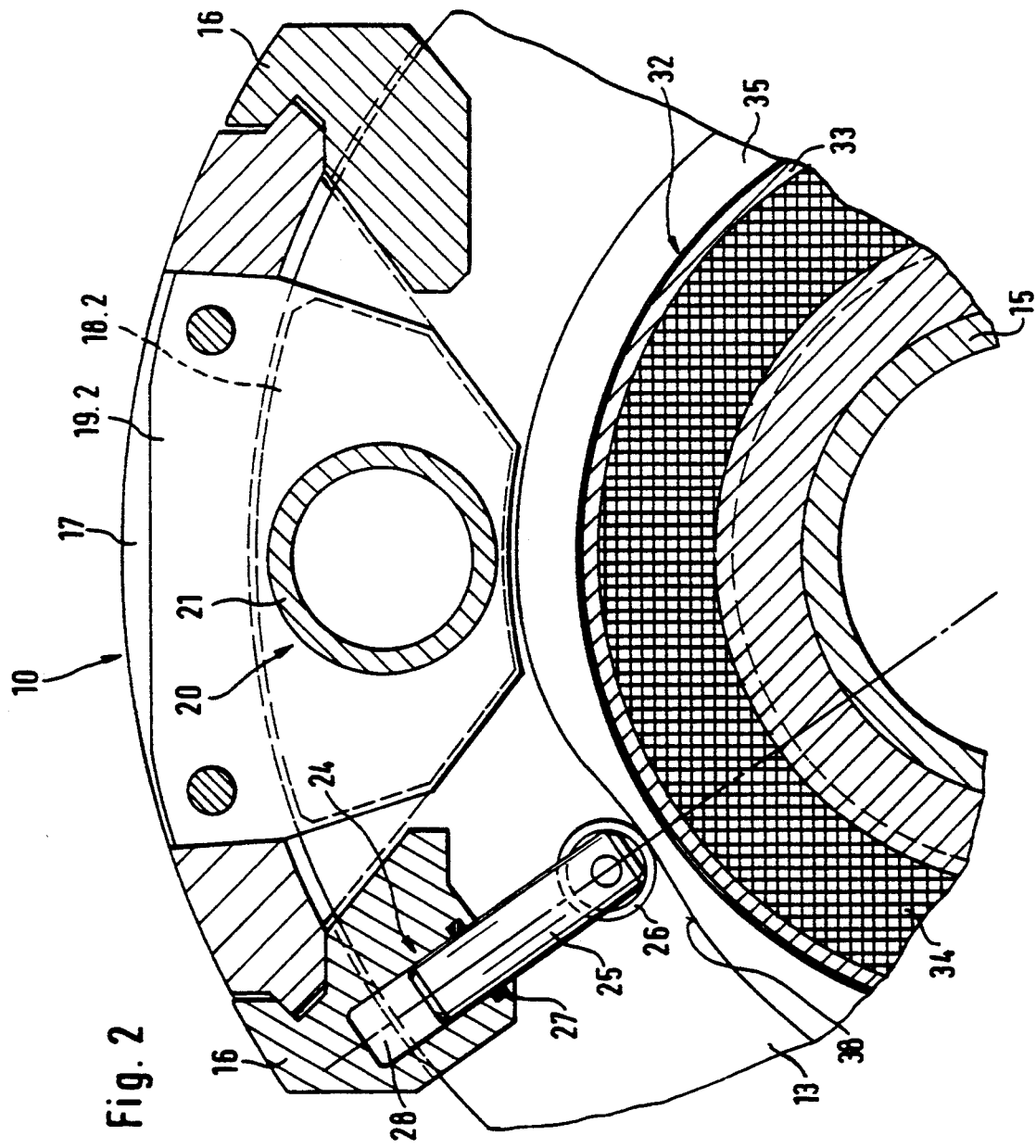
FIG. 2 shows a section through the clamping device along the line II—II in FIG. 1.

The exemplary embodiment represented in FIGS. 1 and 2 of the drawings has as its subject a disk brake 10 as a friction brake for a vehicle that is not represented, such as an automobile. The vehicle has a wheel axle 11, on which a wheel hub 12 is disposed, fixed against relative rotation (FIG. 1). The hub 12 is designed to receive the wheel rim of a vehicle wheel (not represented). Coaxially with the wheel axle, a brake disk 13 is screwed onto the wheel hub 12, fixed against relative rotation, acting as a friction member of the disk brake 10. The wheel axle 11, the wheel rim 12 with the vehicle wheel and the disk brake 13 are rotatably seated by means of a wheel bearing 14 in a steering knuckle 15 (only partly represented) of the vehicle. A brake anchor plate 16 is secured to the steering knuckle 15. A pincer-like floating caliper 17 that overlaps the brake disk 13 is seated such that it is movable parallel to the wheel axle 11 in the brake anchor plate 16. Friction linings 18.1 and 18.2 with backplates 19.1 and 19.2 are received in the floating caliper 17 on both opposite sides of the brake disk 13. Moreover, the floating caliper 17 is equipped with a clamping device 20 for pressing the friction linings 18.1 and 18.2 against the brake disk 13. For this purpose the clamping device 20 has a longitudinally movable piston 21 (FIG. 2), which is parallel to the wheel axle 11. The piston 21 of the clamping device 20 engages the backplate 19.2 of the associated friction lining 18.2.

The clamping device 20 also includes a device 24 for generating hydraulic pressure, which can act upon the piston 21 during a brake operation. This device 24 has a piston 25 with a relatively small diameter that is partially received in the brake anchor plate 16. An axis of symmetry through the piston is shown in FIG. 2. The piston 25 extends radially to the wheel axle 11 and, on its side toward the wheel axis, where it projects freely from the brake anchor plate 16, it supports a roller 26 that is seated as a roll body on an axis parallel to the wheel axle. The piston 25 is longitudinally movably guided in the brake anchor plate 16, penetrating a sealing ring 27, and with its face end it defines a positive displacement chamber 28. This chamber communicates with a cylinder (not shown) of the piston 21 via a hose 29 for pressure fluid. The positive displacement chamber 28, the cylinder of the piston 21 and the pressure fluid hose 29, which forms a line between the two, are filled with pressure fluid (brake fluid).

The disk brake 10 is provided with an electromagnetic friction clutch 32 which connects the clamping device 20 or the device 24 for generating hydraulic pressure with a drive source. The friction clutch 32, disposed on the same axis with respect to the wheel axle 11, has a stationary first coupling half 33, which is connected with the steering knuckle 15, and in which an electric coil 34 for the generation of a magnetic field is received. The second coupling half 35 of the friction clutch 32 is disposed between the first coupling half 33 and the brake disk 13. The second coupling half 35, which is rotatably and axially movably seated on the steering knuckle 15 by means of a coupling bearing 36, has a friction lining 37 on the side of the brake disk 13. The second coupling half 35, which overlaps the one coupling half 33 on the circumferential side, is provided with a cam race 38. The roll 26 of the piston 25 is supported on this cam race 38 (FIG. 2). The drawing shows the piston 25 in its resting position, in which the positive displacement chamber 28 has its largest volume. In this position of the piston 25, the friction linings 18.1 and 18.2 do not engage the brake disk 13. In opposite directions from the piston 25, the cam race 38 is designed with a contour that is symmetrical with the longitudinal axis of the piston which slopes radially; i.e., the radial spacing of the cam race from the wheel axle 11 increases with increasing distance from the axis of symmetry.

MODE OF OPERATION

For decelerating the vehicle wheel connected with the wheel hub 12 or the vehicle, the friction linings 18.1 and 18.2 of the disk brake 10 can be pressed in a known manner against the brake disk 13, which is connected in a manner fixed against relative rotation on the same axle as the vehicle wheel, by means of the clamping device 20. The rotating vehicle wheel acts as a drive source for the clamping device 20. For this purpose the energy at the rotating vehicle wheel is taken up by means of the infinitely variable friction clutch 32 and metered with the hydraulic fluid as an energy carrier via the device 24 that acts as a pump to generate hydraulic pressure to the clamping device 20 as follows: to initiate braking, a magnetic field is generated in the field coil 34 of the first coupling half fixedly disposed on the steering knuckle 15, by means of which the second coupling half 35, which is rotatably seated on the steering knuckle 15, is brought into frictional engagement with the brake disk 13. The torque transmitted from the brake disk 13 to the second coupling half 35 effects a rotating movement of the second coupling half that amounts to a fraction of one revolution. The rotating movement of the second coupling half 35 is transmitted via the cam race 38 to the piston 25 of the device 24. The piston 25, which has moved radially outward because of this, displaces hydraulic fluid from the positive displacement chamber 28, so that the piston 21 of the clamping device 20 is subject to a pressure impingement. The piston 21 executes an axial stroke, because of which the friction lining 18.2 and, via the floating caliper 17, the friction lining 18.1 are also pressed against the brake disk 13. Accordingly, the vehicle wheel equipped with the disk brake 10 is also decelerated.

The moment and thus the clamping power of the friction linings 18.1 and 18.2, which can be transmitted from the friction clutch 32, are adjustable with the help of the exciting current in the field coil 34. The coupling moment is independent of the rpm difference between the second coupling half 35 and the brake disk 13 within certain limits, and therefore independent of the speed of rotation of the vehicle wheel that is provided with the disk brake 10. With a vehicle provided with such a disk brake 10, the desired deceleration during braking is directly adjustable with the aid of the electrical current for triggering the coupling half 32.

The contour of the cam race 38 and the ratio of the effective areas of the piston surfaces, of the piston 25 of the device 24 for generating hydraulic pressure, and of the piston 21 of the clamping device 20 are selected in such a way that the rolling path of the vehicle wheel and thus the reaction time between initiation of braking and the beginning of the braking effect, which is necessary for clamping the friction linings 18.1 and 18.2, becomes very short. Moreover, the seating of the second coupling half 35, of the pistons 21 and 25 is designed to have very little friction, so that during brake release, i.e., when reducing or ending the frictional engagement between the second coupling half 35 and the brake disk 13, the aforementioned elements of the disk brake 10 can return automatically to their resting position, and the friction linings 18.1 and 18.2 can release the brake disk 13.

The braked vehicle wheel can also be kept stationary with the disk brake 10 when the vehicle is stopped by maintaining the magnetic field of the friction clutch 32, so that the coupling half 35 remains in frictional engagement with the brake disk 13 and activates the clamping device 20. Because of the symmetrical shape of the cam race 38 and of the device 24 for generating hydraulic pressure, which is consequently effective in both directions of rotation of the vehicle wheel, the disk brake 10 is also usable when the vehicle is moving in reverse.

During braking, heat loss occurs because of the frictional slippage between the friction lining 37 of the coupling half 35 and the brake disk 13, and is dissipated through the brake disk, around which air circulates. In the non-braking position, on the other hand, the frictional engagement between the clutch 32 and the brake disk 13 is canceled.

To maintain the effect of the disk brake 10, even when the friction linings 18.1 and 18.2 are becoming worn, it is necessary to equip the disk brake 10 with a wear compensation device. The compensation device (not shown) can be disposed in the area of the clamping device 20. It can be formed by a piston 21 that lengthens depending on the wear on the friction lining, for example.

Figure 3:
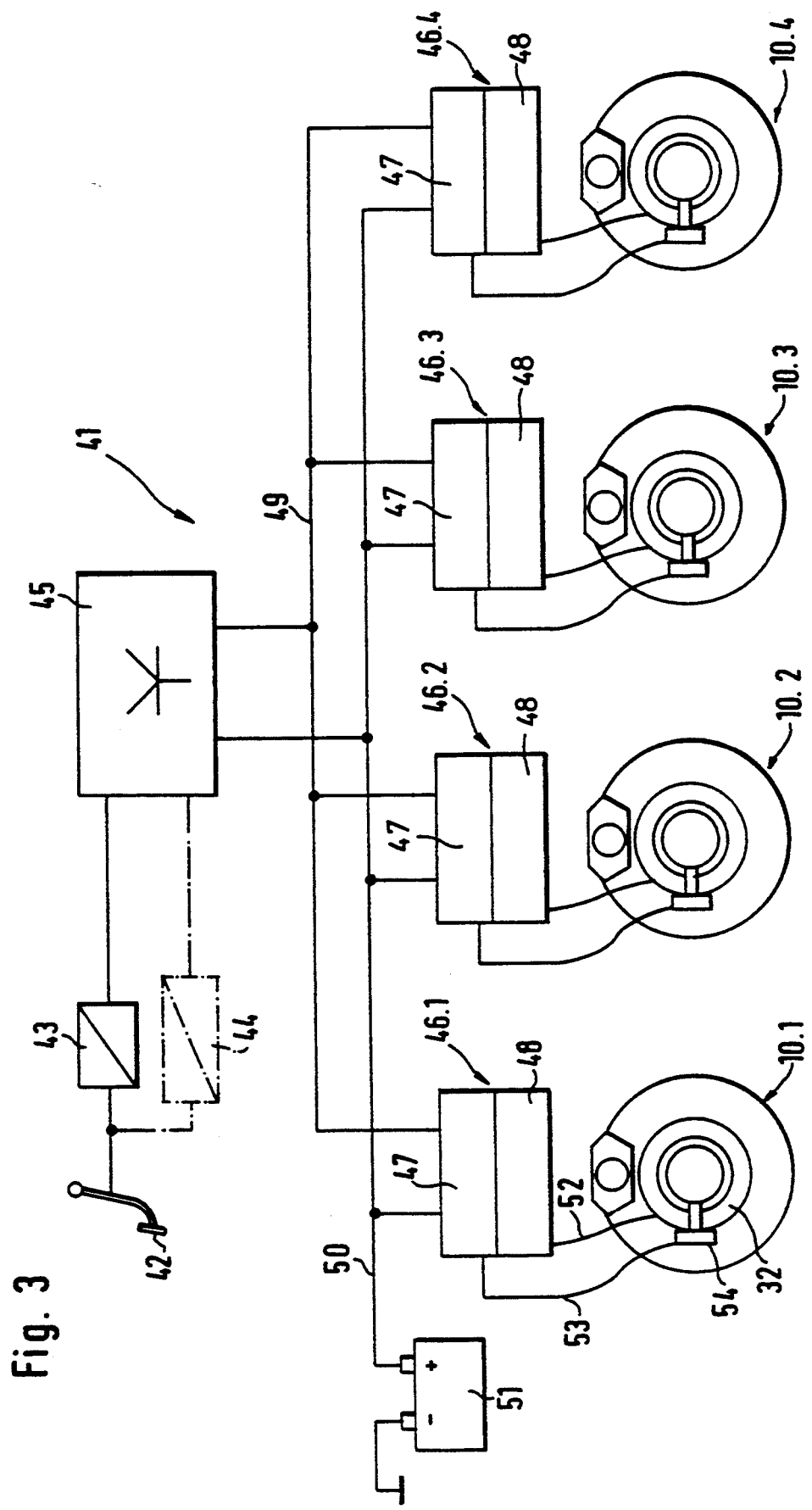
FIG. 3 is a schematic drawing of a brake system of a vehicle that is provided with friction brakes of this type.

A brake system 41 shown in FIG. 3 for a passenger car, for example, has four disk brakes 10.1 through 10.4 of the type described above. The brake system 41 is operable by means of a brake pedal 42, which acts on a pressure transducer 43. Instead of the pressure transducer 43, a travel or force simulator 44 can be in engagement with the brake pedal 42. The pressure transducer 43 or the simulator 44 is connected to an electronic control unit 45 of a master computer of the brake system 41. An electronic wheel module 46.1–46.4 that is divided into a control element 47 and an output element 48 is associated with the disk brakes 10.1 through 10.4. The control elements 47 are connected via a data bus 49 to the control unit 45; the control unit 45 and the wheel modules 46.1 through 46.4 are connected by lines 50 to a battery 51 for power supply. An electric control line 52 leads from the respective output element 48 to the friction clutch 32 of the appropriate disk brake 10.1 through 10.4. From the respective control element 47, a signal line 53 leads to an rpm sensor 54 that monitors the rotating behavior of the vehicle wheel associated with the appropriate disk brake 10.1 through 10.4.

When the brake pedal 42 is actuated, the electronic control unit 45 triggers the wheel modules 46.1 through 46.4, which meter the exciting current necessary for deceleration for the friction clutches 32. Because of the individual wheel monitoring of the wheel behavior by means of the rpm sensor 54, the braking force at every disk brake 10.1 through 10.4 can be adjusted to correspond to the requirements. In this way individual wheel control, such as for increasing, driving stability, or for anti-skid protection or traction control, is possible.

The friction brake in accordance with the invention can also be applied to or used in a drum brake.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A friction brake for vehicles, comprising a brake disk (13) that is connected coaxially to a vehicle wheel in a manner fixed against relative rotation, at least one friction lining (18.1, 18.2) associated with the brake disk (13); secured relative to said friction lining, a clamping device (20), a first piston (21) for pressing the at least one friction lining (18.1, 18.2) against the brake disk (13); a clutch (32) mechanically connected to the clamping device (20), a drive source for driving said clamping device via said clutch; said clutch is an electromagnetic friction clutch (32) which is disposed coaxially with said brake disk (13), a first clutch half (33) of said electromagnetic friction clutch is stationary and a second clutch half (35) is rotatably seated independently of the vehicle wheel and is brought into controllable frictional engagement with the brake member (13), said second clutch half (35) of the friction clutch (32) acts on a device (24) for generating hydraulic pressure independently of the direction of rotation of the vehicle wheel, which pressure can act upon the clamping device (20) and said at least one friction lining.

2. The friction brake as defined by claim 1, in which said second clutch half (35) of the clutch (32) is embodied on a circumferential side as a cam race (38), on which a radially disposed second piston (25) of said device (24) is supported for generating hydraulic pressure at least indirectly.

3. The friction brake as defined by claim 2, in which the surface of the cam race (38), in opposite direction from the second piston (25) in its resting position is preferably provided with a symmetrical contour that rises radially as the distance from an axis of symmetry along said second piston increases.

4. The friction brake as defined by claim 2, in which the second piston (25) is supported on the cam race (38) by a roller body (26).

5. The friction brake as defined by claim 2, in which the second piston (25) of the device (24) for generating hydraulic pressure communicates with the first piston (21) of the clamping device (20) by means of a pressure fluid hose (29).

* * * * *